(12) United States Patent
Kikugawa

(10) Patent No.: US 10,770,077 B2
(45) Date of Patent: Sep. 8, 2020

(54) ELECTRONIC DEVICE AND METHOD

(71) Applicant: Toshiba Client Solutions CO., Ltd., Koto-ku, Tokyo (JP)

(72) Inventor: Yusaku Kikugawa, Tokyo (JP)

(73) Assignee: Toshiba Client Solutions CO., Ltd., Tokyo (JP)

( * ) Notice: Subject to any disclaimer, the term of this patent is extended or adjusted under 35 U.S.C. 154(b) by 2 days.

(21) Appl. No.: 16/298,889

(22) Filed: Mar. 11, 2019

(65) Prior Publication Data

US 2019/0206413 A1 Jul. 4, 2019

Related U.S. Application Data

(63) Continuation of application No. 15/056,942, filed on Feb. 29, 2016, now abandoned.

(60) Provisional application No. 62/218,417, filed on Sep. 14, 2015.

(51) Int. Cl.
| | |
|---|---|
| *G10L 17/22* | (2013.01) |
| *G06F 3/16* | (2006.01) |
| *G10L 25/87* | (2013.01) |
| *G10L 21/12* | (2013.01) |
| *G10L 17/00* | (2013.01) |

(52) U.S. Cl.
CPC ........... *G10L 17/22* (2013.01); *G06F 3/165* (2013.01); *G10L 21/12* (2013.01); *G10L 25/87* (2013.01); *G10L 17/00* (2013.01)

(58) Field of Classification Search
None
See application file for complete search history.

(56) References Cited

U.S. PATENT DOCUMENTS

| | | | |
|---|---|---|---|
| 6,477,491 B1 | 11/2002 | Chandler et al. | |
| 8,504,364 B2 | 8/2013 | Bodin et al. | |
| 8,675,973 B2 | 3/2014 | Hirohata et al. | |
| 9,111,579 B2 | 8/2015 | Meaney et al. | |
| 10,089,061 B2 | 10/2018 | Kikugawa | |
| 10,133,538 B2* | 11/2018 | McLaren | G06F 16/683 |
| 2001/0003185 A1 | 6/2001 | Lee et al. | |
| 2002/0007717 A1* | 1/2002 | Uehara | G10L 17/00 84/600 |

(Continued)

FOREIGN PATENT DOCUMENTS

| | | |
|---|---|---|
| EP | 2 755 399 A1 | 7/2014 |
| JP | H11-053385 | 2/1999 |

(Continued)

OTHER PUBLICATIONS

The Extended European Search Report issued by European Patent Office dated Feb. 22, 2016 in the corresponding European patent application No. 15161837.8—8 pages.

*Primary Examiner* — Tuan S Nguyen
(74) *Attorney, Agent, or Firm* — Knobbe, Martens, Olson & Bear, LLP

(57) ABSTRACT

According to one embodiment, an electronic device records an audio signal, determines a plurality of user-specific utterance features within the audio signal, the plurality of user-specific utterance features including a first set of user specific-utterance features associated with the registered user and a second set of user-specific utterance features associated with the unregistered user, and displays the identifier of the registered user differently than an identifier of the unregistered user.

10 Claims, 11 Drawing Sheets

(56) References Cited

U.S. PATENT DOCUMENTS

| | | |
|---|---|---|
| 2002/0032563 A1 | 3/2002 | Kamai |
| 2003/0050777 A1 | 3/2003 | Walker |
| 2003/0220798 A1 | 11/2003 | Schmid et al. |
| 2004/0117186 A1 | 6/2004 | Ramakrishnan et al. |
| 2004/0204939 A1 | 10/2004 | Liu et al. |
| 2005/0010639 A1 | 1/2005 | Long et al. |
| 2005/0182627 A1 | 8/2005 | Tanaka et al. |
| 2010/0073454 A1 | 3/2010 | Lovhaugen et al. |
| 2010/0250252 A1 | 9/2010 | Yasoshima |
| 2011/0112832 A1 | 5/2011 | Prorock et al. |
| 2011/0112833 A1 | 5/2011 | Frankel et al. |
| 2011/0154192 A1 | 6/2011 | Yang et al. |
| 2011/0301952 A1 | 12/2011 | Kishinaka et al. |
| 2012/0173229 A1 | 7/2012 | Peterson |
| 2013/0060592 A1 | 3/2013 | Motoyama |
| 2013/0083903 A1 | 4/2013 | Peterson |
| 2013/0182063 A1 | 7/2013 | Jaisawal et al. |
| 2013/0232150 A1 | 9/2013 | Gingras et al. |
| 2014/0074471 A1 | 3/2014 | Sankar et al. |
| 2014/0078938 A1 | 3/2014 | LaChapelle et al. |
| 2014/0164501 A1 | 6/2014 | Herger et al. |
| 2014/0201637 A1 | 7/2014 | Na et al. |
| 2014/0280265 A1 | 9/2014 | Wang |
| 2014/0303969 A1 | 10/2014 | Inose et al. |
| 2014/0358536 A1 | 12/2014 | Choi |
| 2015/0025887 A1 | 1/2015 | Sidi et al. |
| 2015/0112684 A1 | 4/2015 | Scheffer et al. |
| 2015/0142434 A1 | 5/2015 | Wittich et al. |
| 2015/0205568 A1 | 7/2015 | Matsuoka |
| 2015/0206537 A1 | 7/2015 | Fusakawa et al. |
| 2015/0264310 A1 | 9/2015 | Krishnaswamy et al. |
| 2015/0302868 A1 | 10/2015 | Sikveland et al. |
| 2015/0310863 A1 | 10/2015 | Chen et al. |
| 2015/0364130 A1 | 12/2015 | Ponting et al. |
| 2015/0365725 A1 | 12/2015 | Belyaev et al. |
| 2016/0006574 A1 | 1/2016 | Fahlgren et al. |
| 2016/0063357 A1 | 3/2016 | Gao et al. |
| 2016/0093315 A1 | 3/2016 | Kikugawa |
| 2016/0119315 A1 | 4/2016 | Uzelac et al. |
| 2016/0142451 A1 | 5/2016 | Ouyang et al. |
| 2016/0247520 A1 | 8/2016 | Kikugawa |
| 2017/0061987 A1 | 3/2017 | Kikugawa |
| 2017/0075652 A1 | 3/2017 | Kikugawa |

FOREIGN PATENT DOCUMENTS

| | | |
|---|---|---|
| JP | 2000-112490 A | 4/2000 |
| JP | 2003-216179 A | 7/2003 |
| JP | 2005-267279 | 9/2005 |
| JP | 2007-233075 | 9/2007 |
| JP | 2010-032792 | 2/2010 |
| JP | 2010-054991 | 3/2010 |
| JP | 2011-102862 | 5/2011 |
| JP | 2011-191824 | 9/2011 |
| JP | 5174068 B2 | 4/2013 |
| JP | 2014-198199 | 9/2014 |
| JP | 2014-203031 A | 10/2014 |
| JP | 2015-094811 | 5/2015 |
| JP | 2016-071029 | 5/2016 |
| WO | WO 2015/198488 | 12/2015 |

\* cited by examiner

F.I.G. 2

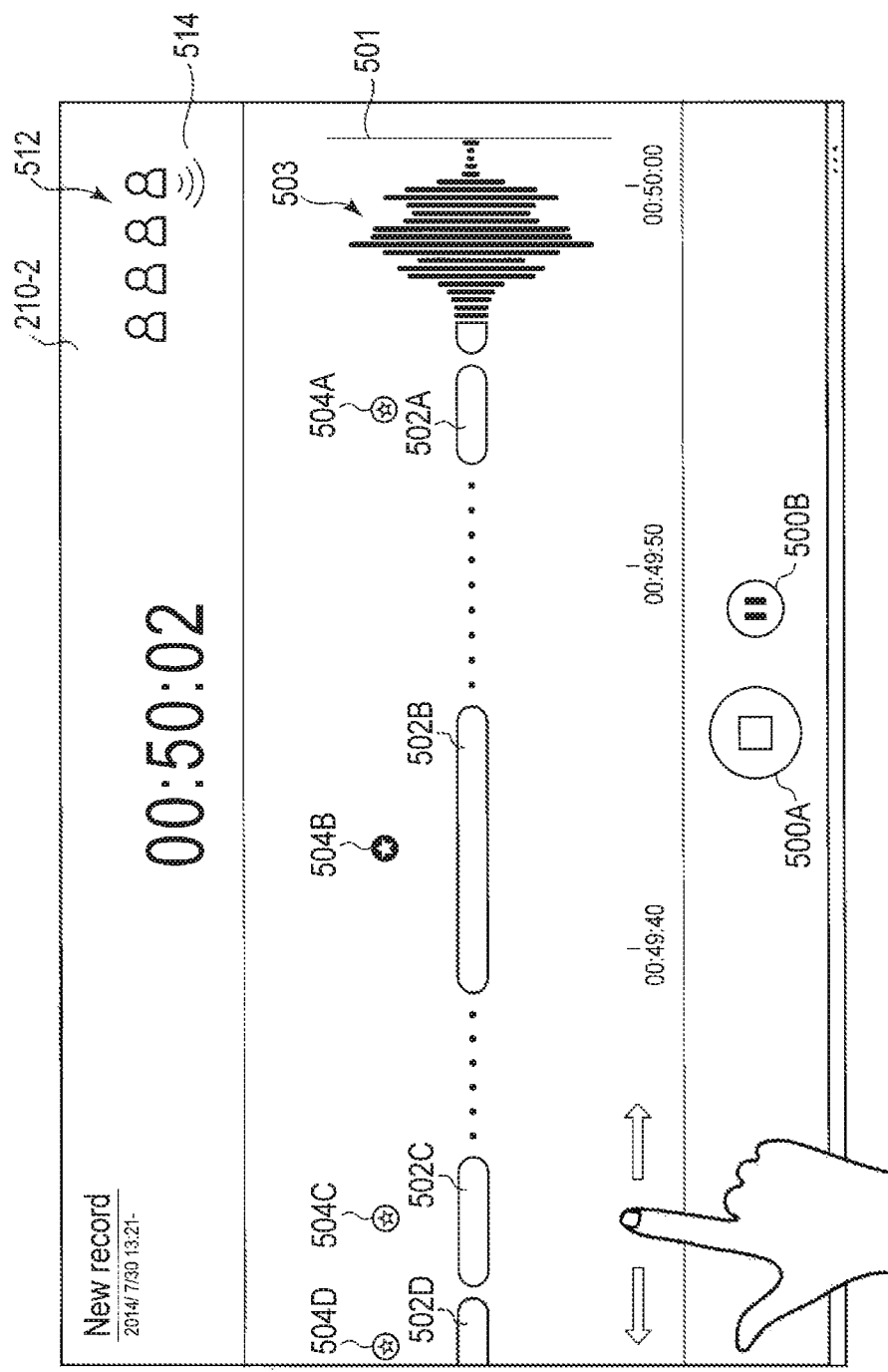
F I G. 5

F.I.G. 6

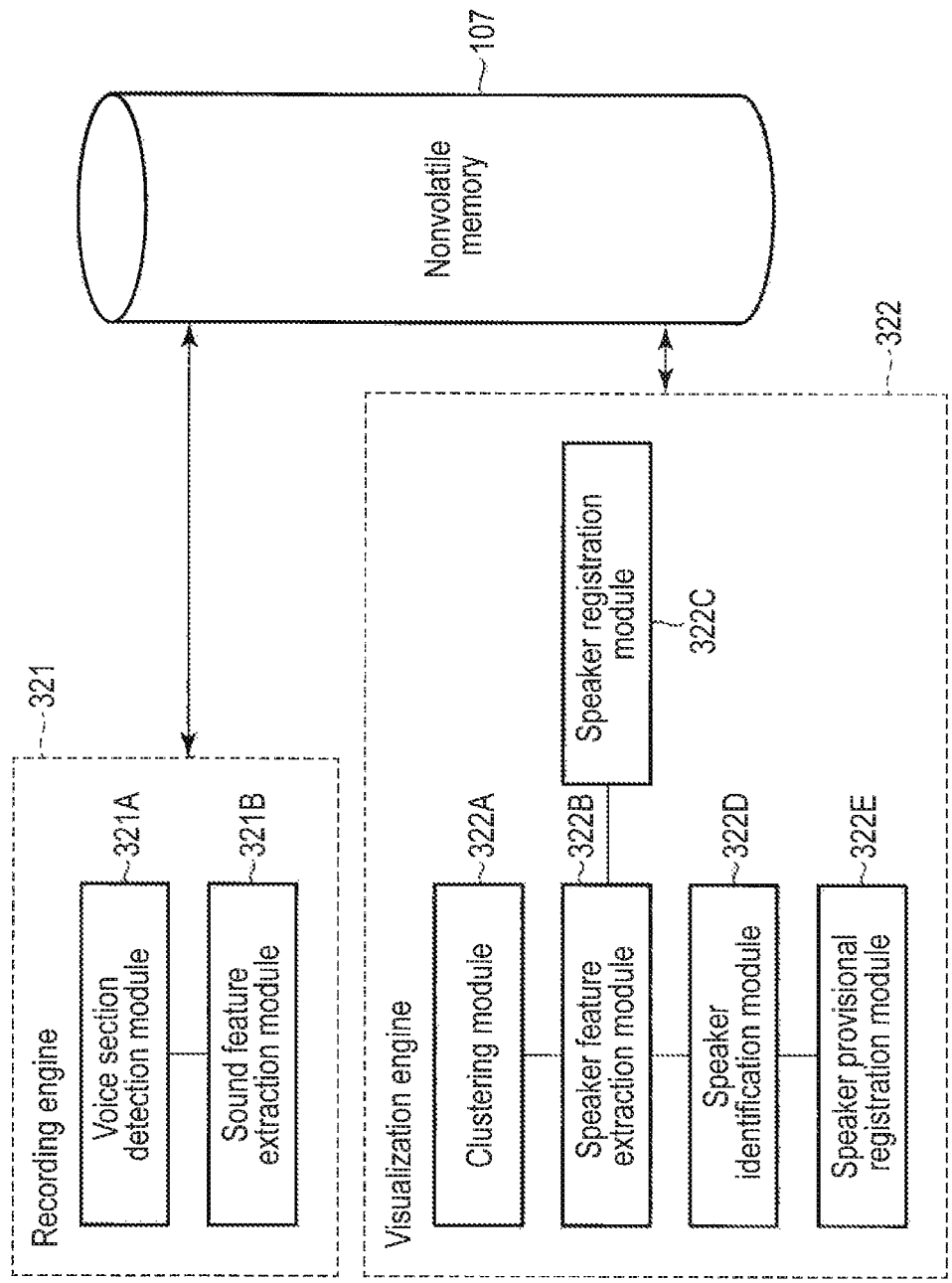
F I G. 7

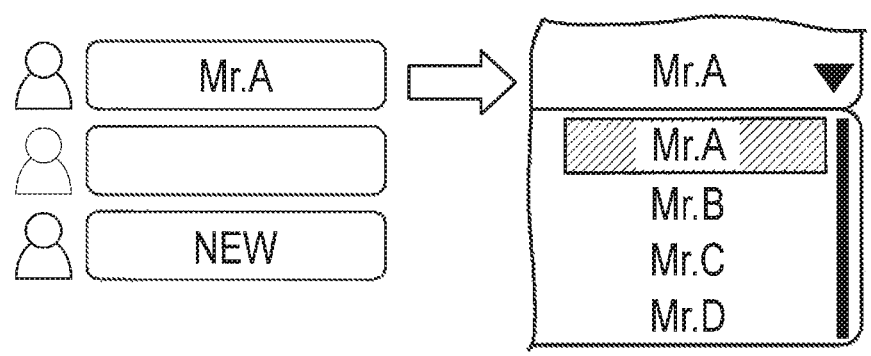
F I G. 10

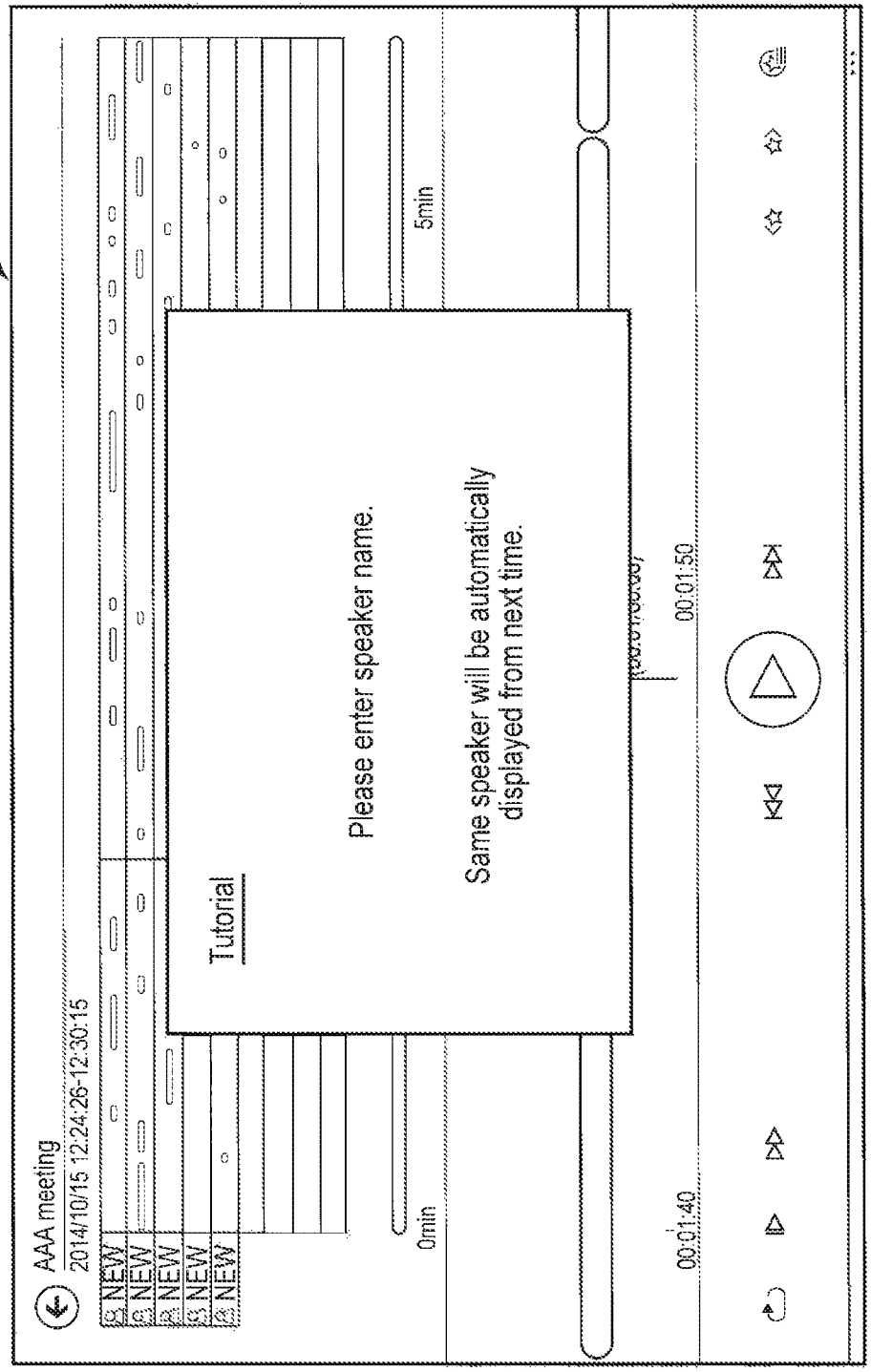
F I G. 11

ELECTRONIC DEVICE AND METHOD

CROSS-REFERENCE TO RELATED APPLICATIONS

This application is a continuation of U.S. application Ser. No. 15/056,942, filed Feb. 29, 2016, the entire contents of which are incorporated by reference herein, and which claims the benefit of U.S. Provisional Application No. 62/218,417, filed Sep. 14, 2015, the entire contents of which are incorporated herein by reference.

FIELD

Embodiments described herein relate generally to an electronic device and a method.

BACKGROUND

Conventionally, an electronic device records an audio signal and displays a waveform of the audio signal. If the electronic device records the audio signals of a plurality of members in a meeting, the waveforms do not identify the speakers.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention. Throughout the drawings, reference numbers are re-used to indicate correspondence between referenced elements.

FIG. 5 is a diagram showing an example of a recording view of embodiments.

FIG. 7 is a block diagram showing an example of a functional configuration of a visualization engine of embodiments.

FIG. 10 shows an example of a pop-up displayed when a user corrects the speaker name.

FIG. 11 shows an example of a tutorial displayed in the reproduction view.

DETAILED DESCRIPTION

Various embodiments will be described hereinafter with reference to the accompanying drawings.

In general, according to one embodiment, an electronic device includes a microphone, a memory, and a hardware processor. The microphone is configured to obtain audio and convert the audio into an audio signal, the audio including utterances from a first user and utterances from a second user, wherein one of the first user or the second user is a registered user and the other of the first user or second user is an unregistered user. The memory stores an identifier associated with the registered user. The hardware processor in communication with the memory and is configured to: record the audio signal; determine a plurality of user-specific utterance features within the audio signal, the plurality of user-specific utterance features including a first set of user specific-utterance features associated with the registered user and a second set of user-specific utterance features associated with the unregistered user; display the identifier of the registered user differently than an identifier of the unregistered user.

<Plan View of Device>

Figure 1:
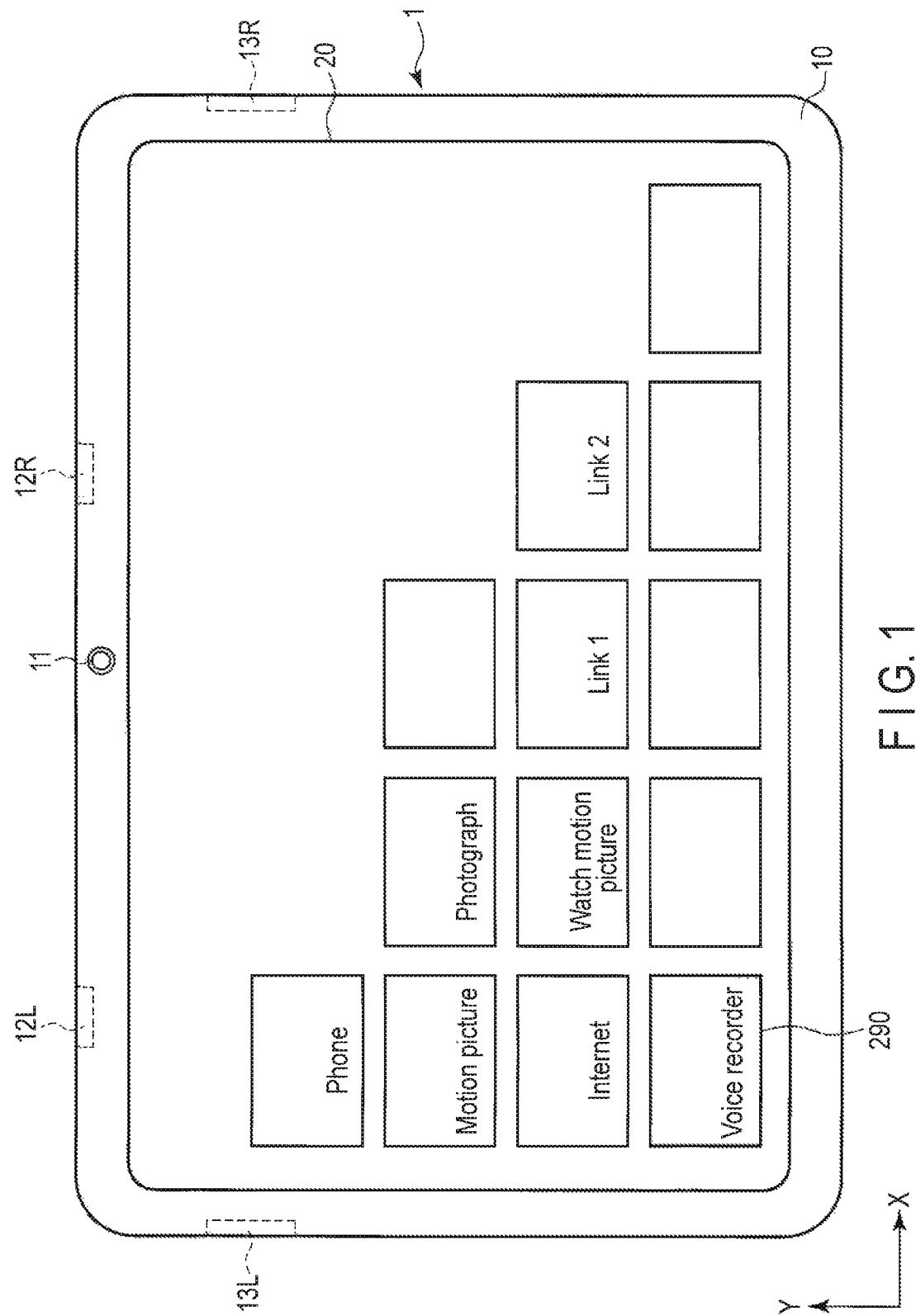
FIG. 1 is a plan view showing an example of an external appearance of embodiments.

FIG. 1 shows a plan view of an example of an electronic device according to certain embodiments. An electronic device 1 may include, for example, a tablet personal computer (portable personal computer [PC]), a smartphone (multifunctional mobile phone), or a personal digital assistant (PDA). In the following description, it is assumed that the electronic device 1 is a tablet personal computer. However, the disclosure is not limited as such and the electronic device 1 may include one or more of the previously described systems. Each element and each structure described hereinafter may be implemented by hardware, by software using a microcomputer (processor, central processing unit [CPU]), or by a combination of hardware and software.

The tablet personal computer (hereinafter, referred to as a tablet PC) 1 may include a main body 10 and a touchscreen display 20.

A camera 11 may be disposed at a particular position of the main body 10, for example, a central position on an upper end of a surface of the main body 10. Moreover, microphones 12R and 12L are disposed at two predetermined positions of the main body 10, for example, two positions separated from each other on the upper end of the surface of the main body 10. The camera 11 may be disposed between the two microphones 12R and 12L. The number of microphones may be optionally set. Loudspeakers 13R and 13L are disposed at other two predetermined positions of the main body 10, for example, a left side and a right side of the main body 10. Although not shown in the figures, a power switch (power button), a lock mechanism, an authentication unit, etc., may be disposed at other predetermined positions of the main body 10. The power switch turns on or off a power supply that supplies power to one or more elements of the tablet PC 1 enabling a user to user the tablet PC 1 (activating the tablet PC 1). The lock mechanism, for example, locks the operation of the power switch at the time of conveyance. The authentication unit, for example, reads (biometric) data associated with a user's finger or palm to authenticate the user.

The touchscreen display 20 includes a flat panel display 21, such as a liquid crystal display (LCD), and a touchpanel 22. The flat panel display 21 may include a plasma display or an organic LED (OLED) display. The touchpanel 22 is attached to the surface of the main body 10 so as to cover a screen of the LCD 21. The touchscreen display 20 detects a touch position of an external object (stylus or finger) on a display screen. The touchscreen display 20 may support a multi-touch function by which a plurality of touch positions can be simultaneously detected. The touchscreen display 20 can display several icons for activating various application programs on the screen. The icons may include an icon 290 for activating a voice recorder program. The voice recorder program has a function of visualizing the content of a recording in a meeting, etc.

<System Configuration>

Figure 2:
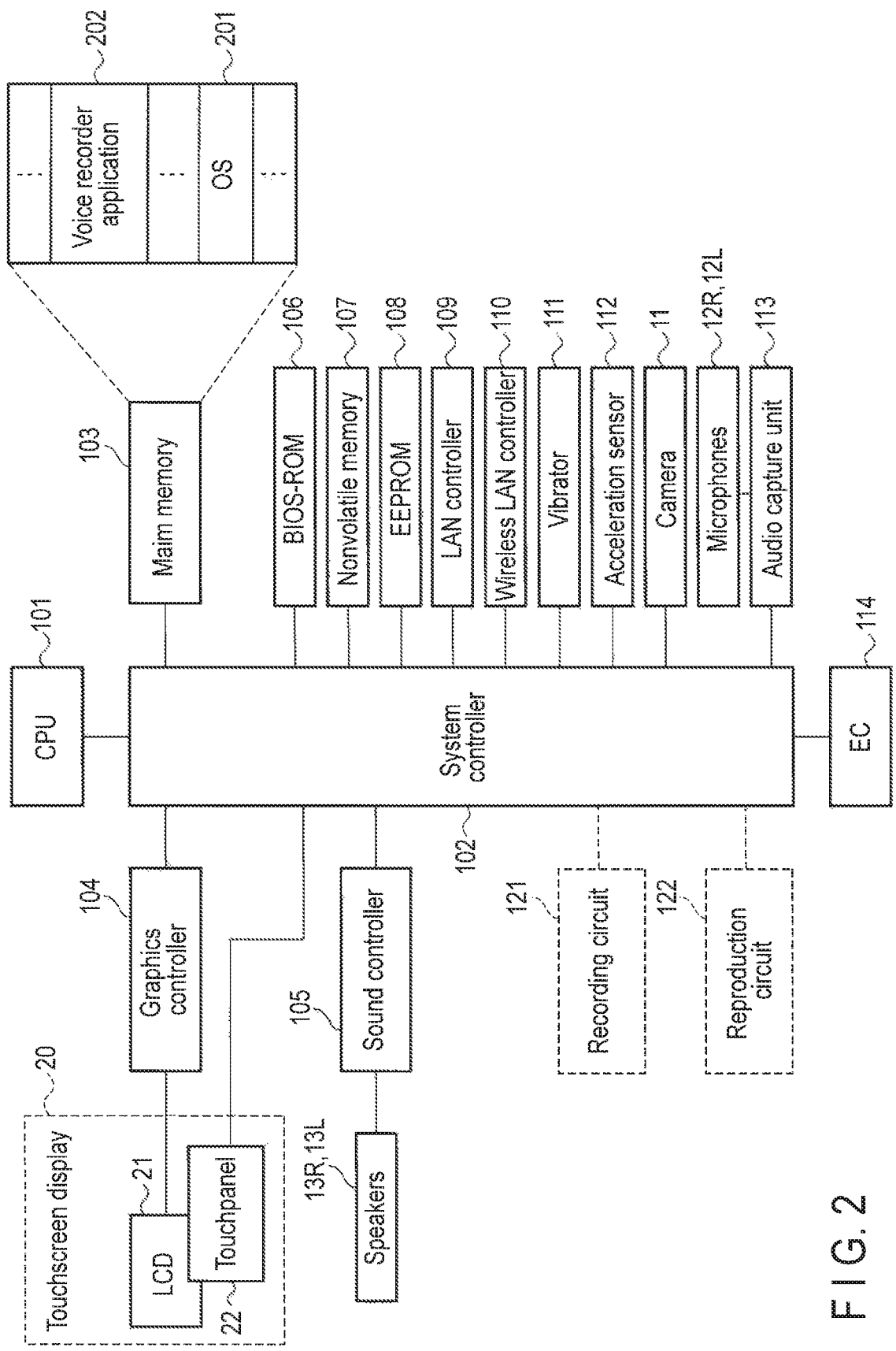
FIG. 2 is a block diagram showing an example of a system configuration of embodiments.

FIG. 2 shows an example of a system configuration of the tablet PC 1. As well as the elements shown in FIG. 1, the tablet PC 1 may comprise a CPU 101, a system controller 102, a main memory 103 which is volatile memory, such as RAM, a graphics controller 104, a sound controller 105, a BIOS-ROM 106, a nonvolatile memory 107, an EEPROM 108, a LAN controller 109, a wireless LAN controller 110, a vibrator 111, an acceleration sensor 112, an audio capture unit 113, an embedded controller (EC) 114, etc.

The CPU 101 is a processor circuit configured to control operation of each element in the tablet PC 1. The CPU 101 executes various programs loaded from the nonvolatile memory 107 to the main memory 103. The programs may include an operating system (OS) 201 and various application programs. The application programs include a voice recorder application 202.

Various features of the voice recorder application 202 will be explained. The voice recorder application 202 can record an audio data item corresponding to a sound input via the microphones 12R and 12L (a sound collected by the microphone 12R and 12L). The voice recorder application 202 can extract voice sections from the audio data item, and classify the respective voice sections into clusters corresponding to speakers in the audio data item. The voice recorder application 202 has a visualization function of displaying the voice sections speaker by speaker, using a result of cluster classification. By the visualization function, which speaker spoke (uttered) can be visibly presented to the user. The voice sections include utterances such as sounds produced by a user including humming, whistling, moans, grunts, singing, and any other sounds a user may make including speech. The voice recorder application 202 supports a speaker selection reproduction function of continuously reproducing only voice sections of a selected speaker.

These functions of the voice recorder application 202 can be each carried out by a circuit such as a processor. Alternatively, these functions can be carried out by a dedicated circuit such as a recording circuit 121 and a reproduction circuit 122. The recording circuit 121 and the reproduction circuit 122 have the recording function and the reproducing function that are carried out by the processor executing the voice recorder application 202.

The CPU 101 also executes a Basic Input/Output System (BIOS), which is a program for hardware control stored in the BIOS-ROM 106.

The system controller 102 is a device which connects a local bus of the CPU 101 and various components. The system controller 102 also contains a memory controller which exerts access control over the main memory 103. The system controller 102 also has a function of communicating with the graphics controller 104 over a serial bus conforming to the PCI EXPRESS standard, etc. The system controller 102 also contains an ATA controller for controlling the nonvolatile memory 107. The system controller 102 further contains a USB controller for controlling various USB devices. The system controller 102 also has a function of communicating with the sound controller 105 and the audio capture unit 113.

The graphics controller 104 is a display controller configured to control the LCD 21 of the touchscreen display 20. A display signal generated by the graphics controller 104 is transmitted to the LCD 21. The LCD 21 displays a screen image based on the display signal. The touchpanel 22 covering the LCD 21 functions as a sensor configured to detect a touch position of an external object on the screen of the LCD 21. The sound controller 105 converts an audio data item to be reproduced into an analog signal, and supplies the analog signal to the loudspeakers 13R and 13L.

The LAN controller 109 is a wired communication device configured to perform wired communication conforming to, for example, the IEEE 802.3 standard. The LAN controller 109 includes a transmission circuit configured to transmit a signal and a reception circuit configured to receive a signal. The wireless LAN controller 110 is a wireless communication device configured to perform wireless communication conforming to, for example, the IEEE 802.11 standard, and includes a transmission circuit configured to wirelessly transmit a signal and a reception circuit configured to wirelessly receive a signal.

The acceleration sensor 112 is used to detect the current direction (portrait direction/landscape direction) of the main body 10. The audio capture unit 113 carries out analog-to-digital conversion of sound input via the microphones 12R and 12L, and outputs digital signals corresponding to the sound. The audio capture unit 113 can transmit data indicating which of the sound inputs from the microphones 12R and 12L is greater in level to the voice recorder application 202. The EC 114 is a single-chip microcontroller for power management. The EC 114 powers the tablet PC 1 on or off in response to the user's operation of the power switch.

<Functional Configuration>

Figure 3:
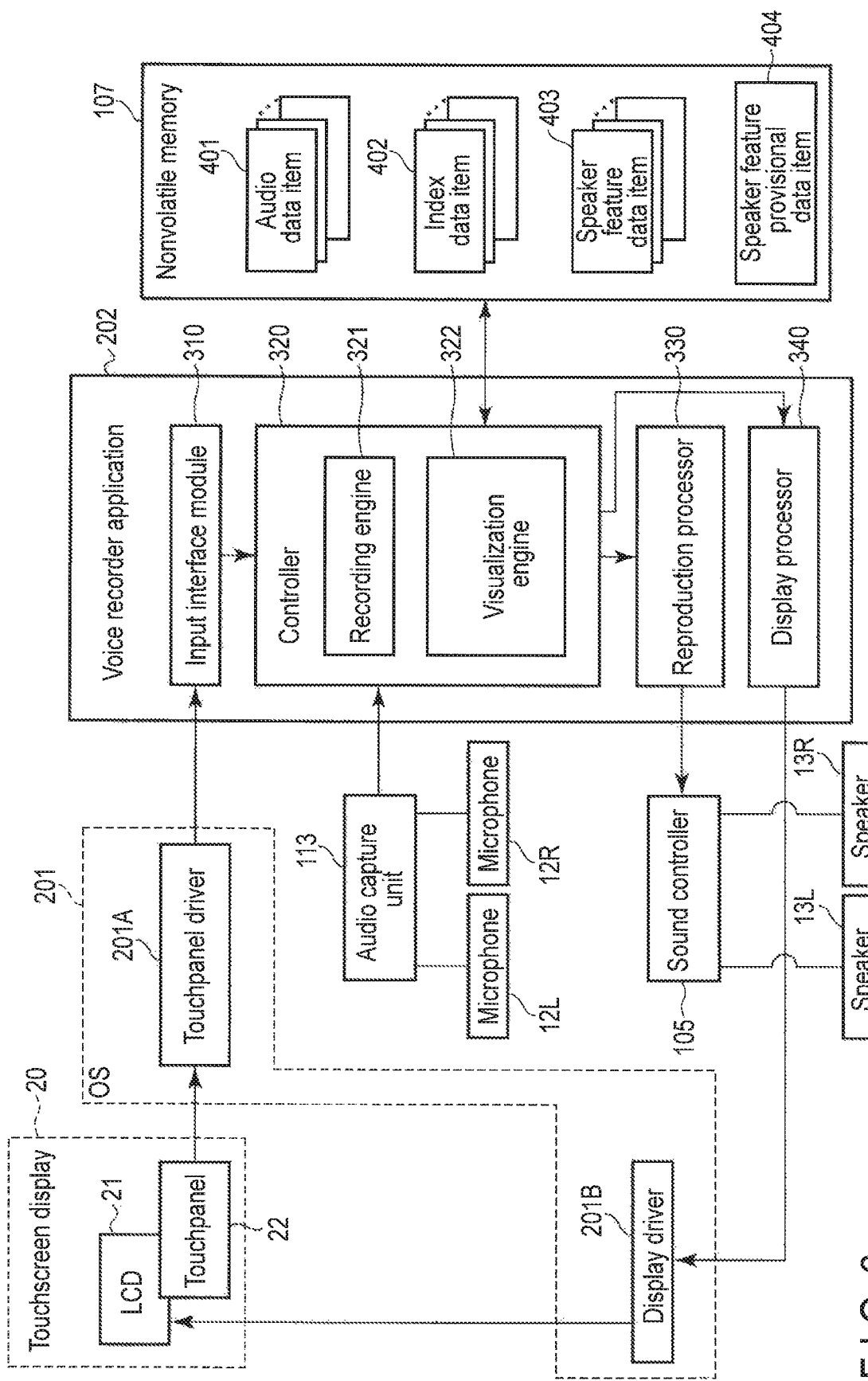
FIG. 3 is a block diagram showing an example of a functional configuration of a voice recorder application of embodiments.

FIG. 3 shows an example of a functional configuration of the voice recorder application 202. The voice recorder application 202 includes an input interface module 310, a controller 320, a reproduction processor 330, a display processor 340, etc., as functional modules of the same program.

The input interface module 310 receives various events from the touchpanel 22 via a touchpanel driver 201A. The events include a touch event, a move event, and a release event. The touch event indicates that an external object has touched the screen of the LCD 21. The touch event includes coordinates of a touch position of the external object on the screen. The move event indicates that the touch position has been moved with the external object touching the screen. The move event includes coordinates of the touch position that has been moved. The release event indicates that the touch of the external object on the screen has been released. The release event includes coordinates of the touch position where the touch has been released.

Based on these events, the following finger gestures are defined.

Tap: touching the user's finger at a position on the screen, and then separating it in an orthogonal direction to the screen ("tap" may be synonymous with "touch").

Swipe: touching the user's finger at an arbitrary position on the screen, and then moving it in an arbitrary direction.

Flick: touching the user's finger at an arbitrary position on the screen, then sweeping it in an arbitrary direction, and separating it from the screen.

Pinch: touching the user's two fingers at an arbitrary position on the screen, and then, changing the distance between the fingers on the screen. In particular, widening the distance between the fingers (opening the fingers) may be referred to as pinch-out (pinch-open), and narrowing the distance between the fingers (closing the fingers) may be referred to as pinch-in (pinch-close).

The controller 320 can detect on which part of the screen, which finger gesture (tap, swipe, flick, pinch, etc.) was made, based on various events received from the input interface module 310. The controller 320 includes a recording engine 321, a visualization engine 322, etc.

The recording engine 321 records an audio data item 401 corresponding to sound input via the microphones 12L and 12R and the audio capture unit 113 in the nonvolatile memory 107. The recording engine 321 can perform recording in various scenes such as recording in a meeting, recording in a telephone conversation, and recording in a presentation. The recording engine 321 also can perform recording of other kinds of audio source input via means other than the microphones 12L and 12R and the audio capture unit 113, such as broadcast and music.

The recording engine 321 performs a voice section detection process of analyzing the recorded audio data item 401 and determining whether it is a voice section or a non-voice section (noise section, silent section) other than the voice section. The voice section detection process is performed, for example, for each voice data sample having a length of time of 0.5 seconds. In other words, a sequence of an audio data item (recording data item), that is, a signal series of digital audio signals, is divided into audio data units each having a length of time of 0.5 seconds (set of audio data samples of 0.5 seconds). The recording engine 321 performs a voice section detection process for each audio data unit. An audio data unit of 0.5 seconds is an identification unit for identifying a speaker through a speaker identification process, which will be described later.

In the voice section detection process, it is determined whether an audio data unit is a voice section or a non-voice section (noise section, silent section) other than the voice section. In this determination of a voice section/a non-voice section, any well-known technique can be used, and for example, voice activity detection (VAD) may be used. The determination of a voice section/a non-voice section may be made in real time during recording.

The recording engine 321 extracts a feature amount (sound feature amount) such as a mel frequency cepstrum cofficient (MFCC) from an audio data unit identified as a voice section.

The visualization engine 322 performs a process of visualizing an outline of a whole sequence of the audio data item 401 in cooperation with the display processor 340. Specifically, the visualization engine 322 performs a speaker identification process, and performs a process of distinguishably displaying when and which speaker spoke in a display area using a result of the speaker identification process.

In the speaker identification process, which speaker spoke (uttered) is detected. The speaker identification process may include speaker clustering. In the speaker clustering, it is identified which speaker spoke in voice sections included in a sequence from the start point to the end point of an audio data item. In other words, in the speaker clustering, the respective voice sections are classified into clusters corresponding to speakers in the audio data item. A cluster is a set of audio data units of the same speaker. As a method of performing speaker clustering, already-existing various methods can be used. For example, in the present embodiment, both a method of performing speaker clustering using a speaker position and a method of performing speaker clustering using a feature amount (sound feature amount) of an audio data item may be used.

The speaker position indicates the position of each speaker with respect to the tablet PC 1. The speaker position can be estimated based on the difference between two audio signals input via the two microphones 12L and 12R. Sounds input at the same speaker position are estimated to be those made by the same speaker.

In the method of performing speaker clustering using a sound feature amount, audio data units having feature amounts similar to each other are classified into the same cluster (the same speaker). As a method of performing speaker clustering using a feature amount, any already-existing method can be used, and for example, a method disclosed in JP 2011-191824 A (JP 5174068 B) may be used. Data indicating a result of speaker clustering is saved on the nonvolatile memory 107 as an index data item 402.

The visualization engine 322 displays individual voice sections in the display area. If there are speakers, the voice sections are displayed in a form in which the speakers of the individual voice sections are distinguishable. That is, the visualization engine 322 can visualize the voice sections speaker by speaker, using the index data item 402.

The reproduction processor 330 reproduces the audio data item 401. The reproduction processor 330 can continuously reproduce only voice sections while skipping a silent section. Moreover, the reproduction processor 330 can also perform a selected-speaker reproduction process of continuously reproducing only voice sections of a specific speaker selected by the user while skipping voice sections of the other speakers.

An example of several views (home view, recording view, and reproduction view) displayed on the screen by the voice recorder application 202 will be next described.

<Home View>

Figure 4:
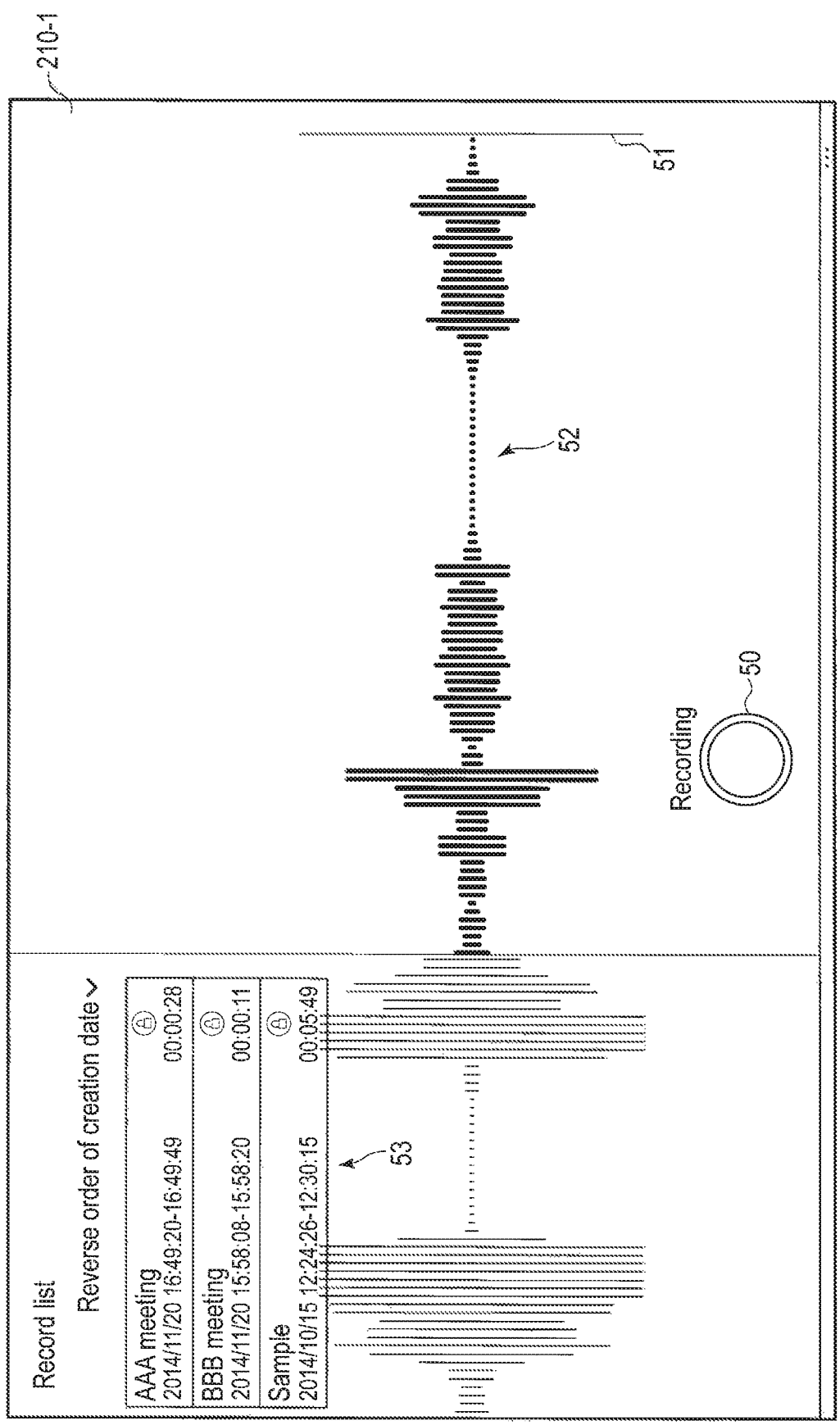
FIG. 4 is a diagram showing an example of a home view of embodiments.

FIG. 4 shows an example of a home view 210-1. If the voice recorder application 202 is activated, the voice recorder application 202 displays the home view 210-1. The home view 210-1 displays a recording button 50, an audio waveform 52 of a predetermined time (for example, thirty seconds), and a record list 53. The recording button 50 is a button for giving instructions to start recording.

The audio waveform 52 indicates a waveform of audio signals currently input via the microphones 12L and 12R. The waveform of audio signals appears continuously in real time at the position of a vertical bar 51 indicating the present time. Then, with the passage of time, the waveform of audio signals moves from the vertical bar 51 to the left. In the audio waveform 52, successive vertical bars have lengths according to power of respective successive audio signal samples. By means of the display of the audio waveform 52, the user can ascertain whether sounds have been normally input, before starting recording.

The record list 53 includes records stored in the nonvolatile memory 107 as audio data items 51. It is herein assumed that there are three records, a record of a title "AAA meeting", a record of a title "BBB meeting", and a record of a title "Sample". In the record list 53, a recording date of a record, a recording start time of a record, a recording end time of a record are also displayed. In the record list 53, recordings (records) can be sorted in reverse order of creation date, in order of creation date, or in order of title.

If a certain record in the record list 53 is selected by the user's tap operation, the voice recorder application 202 starts reproducing the selected record. If the recording button 50 of the home view 210-1 is tapped by the user, the voice recorder application 202 starts recording.

<Recording View>

FIG. 5 shows an example of a recording view 210-2. If the recording button 50 is tapped by the user, the voice recorder application 202 starts recording and switches the display screen from the home view 210-1 of FIG. 4 to the recording view 210-2 of FIG. 5.

The recording view 210-2 displays a stop button 500A, a pause button 500B, a voice section bar 502, an audio waveform 503, and a speaker icon 512. The stop button 500A is a button for stopping the current recording. The pause button 500B is a button for pausing the current recording.

The audio waveform 503 indicates a waveform of audio signals currently input via the microphones 12L and 12R. The audio waveform 503 continuously appears at the position of a vertical bar 501, and moves to the left with the passage of time, like the audio waveform 402 of the home view 210-1. Also in the audio waveform 503, successive vertical bars have lengths according to power of respective successive audio signal samples.

During recording, the above-described voice section detection process is performed. If it is detected that one or more audio data units in an audio signal are a voice section (human voice), the voice section corresponding to the one or more audio data units is visualized by the voice section bar 502 as an object indicating the voice section. The length of the voice section bar 502 varies according to the length of time of the corresponding voice section.

The voice section bar 502 can be displayed after an input voice is analyzed by the visualization engine 322 and a speaker identification process is performed. Because the voice section bar 502 thus cannot be displayed right after recording, the audio waveform 503 is displayed as in the home view 210-1. The audio waveform 503 is displayed in real time at the right end, and flows to the left side of the screen with the passage of time. If a certain time has passed, the audio waveform 503 switches to the voice section bar 502. Although whether power is due to voice or noise cannot be determined from the audio waveform 503 only, the recording of a human voice can be confirmed by the voice section bar 502. The audio waveform 503 in real time and the voice section bar 502 starting with timing after a delay are displayed in the same row, whereby the user's eyes can be kept in the same row and do not rove, and useful information with good visibility can be obtained.

As shown in FIG. 5, the audio waveform 503 does not switch to the voice section bar 502 at once, but gradually switches. The amplitude of the waveform display is decreased as the time goes so that the waveform display is converged to bar display. The current power is thereby displayed at the right end as the audio waveform 503, the display flows from right to left, and in the process of updating the display, the waveform changes continuously or seamlessly to converge into a bar.

At the upper left side of the screen, a record name ("New record" in an initial state) and the date and time are displayed. At the upper center of the screen, a recording time (which may be the absolute time, but is herein an elapsed time from the start of recording) (for example, 00:50:02) is displayed. At the upper right side of the screen, the speaker icon 512 is displayed. If a currently speaking speaker is identified, a speaking mark 514 is displayed under an icon of the speaker. Below the voice section bar 502, a time axis with a scale per ten seconds is displayed. FIG. 5 visualizes voices for a certain time, for example thirty seconds, until the present time (right end), and shows earlier times on the left side. The time of thirty seconds can be changed.

While the scale of the time axis of the home view 210-1 is fixed, the scale of the time axis of the recording view 210-2 is variable. By swiping from side to side, pinching in or pinching out on the time axis, the scale can be changed, and a display time (thirty seconds in the example of FIG. 5) can be changed. In addition, by flicking the time axis from side to side, the time axis moves from side to side, a voice that was recorded a predetermined time before a certain time in the past can also be visualized, although the display time is not changed.

Above the voice section bars 502A, 502B, 502C, and 502D, tags 504A, 504B, 504C, and 504D are displayed. The tags 504A, 504B, 504C, and 504D are provided to select a voice section, and if a tag is selected, a display form of the tag changes. The change of the display form of the tag means that the tag has been selected. For example, the color, size, and contrast of the selected tag changes. The selection of a voice section by a tag is made, for example, to designate a voice section which is reproduced with priority at the time of reproduction.

<Reproduction View>

Figure 6:
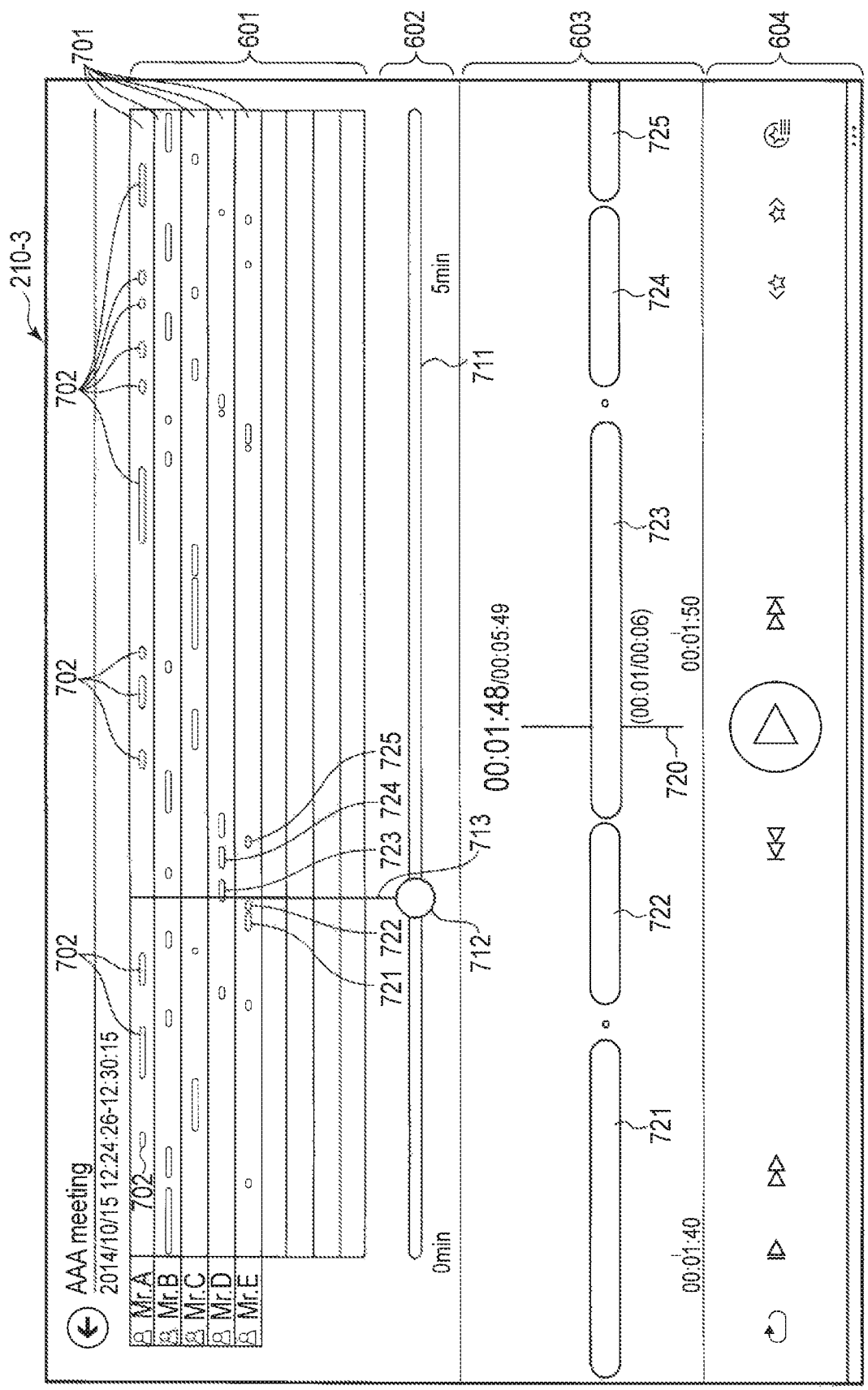
FIG. 6 is a diagram showing an example of a reproduction view of embodiments.

FIG. 6 shows an example of a reproduction view 210-3 in a state in which the reproduction of the record of the title "AAA meeting" is paused while being performed. The reproduction view 210-3 displays a speaker identification result view area 601, a seek bar area 602, a reproduction view area 603, and a control panel 604.

The speaker identification result view area 601 is a display area displaying the whole sequence of the record of the title "AAA meeting". The speaker identification result view area 601 may display time axes 701 corresponding to respective speakers in the sequence of the record. In the speaker identification result view area 601, five speakers are arranged in order of decreasing amount of utterance in the whole sequence of the record of the title "AAA meeting". A speaker whose amount of utterance is the greatest in the whole sequence is displayed on the top of the speaker identification result view area 601. The user can also listen to each voice section of a specific speaker by tapping the voice sections (voice section marks) of the specific speaker in order.

The left ends of the time axes 701 correspond to a start time of the sequence of the record, and the right ends of the time axes 701 correspond to an end time of the sequence of the record. That is, the total time from the start to the end of the sequence of the record is allocated to the time axes 701. However, if the total time is long and all the total time is allocated to the time axes 701, the scale of the time axes may become too small and difficult to see. Thus, the size of the time axes 701 may be variable as in the case of the reproduction view.

On a time axis 701 of a certain speaker, a voice section mark indicating the position and the length of time of a voice section of the speaker is displayed. Different colors may be allocated to speakers. In this case, voice section marks in colors different from speaker to speaker may be displayed. For example, on a time axis of a speaker "Mr. A", voice section marks 702 may be displayed in a color (for example, red) allocated to the speaker "Mr. A".

The seek bar area 602 displays a seek bar 711 and a movable slider (also referred to as a locater) 712. To the seek bar 711, the total time from the start to the end of the sequence of the record is allocated. The position of the slider 712 on the seek bar 711 indicates the current reproduction position. From the slider 712, a vertical bar 713 extends upward. Because the vertical bar 713 traverses the speaker identification result view area 601, the user can easily understand in which speaker's (main speaker's) voice section the current reproduction position is.

The position of the slider 712 on the seek bar 711 moves to the right with the progress of reproduction. The user can move the slider 712 to the right or to the left by a drag operation. The user can thereby change the current reproduction position to an arbitrary position.

The reproduction view area 603 is an enlarged view of a period (for example, a period of approximately twenty seconds) in the vicinity of the current reproduction position. The reproduction view area 603 includes a display area long in the direction of the time axis (here, horizontally). In the reproduction view area 603, several voice sections (detected actual voice sections) included in the period in the vicinity of the current reproduction position are displayed in chronological order. A vertical bar 720 indicates the current reproduction position. If the user flicks the reproduction view area 603, displayed content in the reproduction view area 603 is scrolled to the left or to the right in a state in which the position of the vertical bar 720 is fixed. Consequently, the current reproduction position is also changed.

<Recording Engine>

FIG. 7 is a block diagram showing an example of functional configurations of the recording engine 321 and the visualization engine 322 shown in FIG. 3. As shown in FIG. 7, the recording engine 321 includes a voice section detection module 321A, a sound feature extraction module 321B, etc. As shown in FIG. 7, the visualization engine 322 includes a clustering module 322A, a speaker feature extraction module 322B, a speaker registration module 322C, a speaker identification module 322D, a speaker provisional registration module 322E, etc.

The voice section detection module 321A receives input of an audio data item from the audio capture unit 113. In addition, the voice section detection module 321A performs the above-described voice activity detection (VAD) for the audio data item of the received input.

The sound feature extraction module 321B extracts a sound feature amount from a voice section detected by the voice section detection module 321A as described above.

The clustering module 322A performs the above-described speaker clustering. Specifically, the clustering module 322A classifies respective voice sections into clusters corresponding to speakers included in the audio data item (that is, a set of the respective voice sections) on the basis of a speaker position and the sound feature amount as described above. Data indicating a result of the speaker clustering is stored in the nonvolatile memory 107 as an index data item 402.

The speaker feature extraction module (speaker learning module) 322B performs a process of extracting a speaker-specific feature (speaker feature amount) from a (each) sound feature amount included in one or more voice sections classified into the same cluster by the clustering module 322A. As a method of extracting a speaker feature amount from a sound feature amount, any already-existing method may be used. For example, a technique such as a code mapping method, a neural network method, and a Gaussian mixture model (GMM), is used.

The speaker registration module 322C performs a process of registering (automatically registering) the speaker feature amount extracted by the speaker feature extraction module 322B in the nonvolatile memory 107 as a speaker feature data item 403. In addition, let us assume that a speaker feature provisional data item 404 including a speaker feature amount and a speaker name provisionally registered by the speaker provisional registration module 322E, which will be described later, is stored in the nonvolatile memory 107. In this case, the speaker registration module 322C associates a speaker feature data item 403 including a speaker feature amount according with the speaker feature amount included in the speaker feature provisional data item 404 with the speaker name included in the speaker feature provisional data item 404. Then, the speaker registration module 322C performs a process of reregistering (formally registering) it in the nonvolatile memory 107 as a new speaker feature data item 403. Moreover, let us assume that a speaker feature provisional data item 404 provisionally registered by the speaker provisional registration module 322E is stored in the nonvolatile memory 107, and a speaker feature data item 403 including a speaker feature amount according with a speaker feature amount included in the speaker feature provisional data item 404 is not stored in the nonvolatile memory 107. That is, let us assume that a speaker feature data item 403 on the speaker feature amount has been deleted from the nonvolatile memory 107. In this case, the speaker registration module 322C performs a process of reregistering the speaker feature provisional data item 404 in the nonvolatile memory 107 as a new speaker feature data item 403.

In the above description, if a speaker feature data item 403 including a speaker feature amount according with a speaker feature amount included in a speaker feature provisional data item 404 is stored in the nonvolatile memory 107, a speaker feature amount included in the speaker feature data item 403 originally registered in the nonvolatile memory 107 is associated with a speaker name included in the speaker feature provisional data item 404, and a new speaker feature data item 403 is registered. However, a new speaker feature data item 403 may be registered by overwriting the originally registered speaker feature data item 403 with the speaker feature provisional data item 404.

In addition, assume that if the speaker registration module 322C tries to register a speaker feature amount extracted by the speaker feature extraction module 322B in the nonvolatile memory 107 as a speaker feature data item 403, a speaker feature data item 403 including the speaker feature mount is already registered in the nonvolatile memory 107. In this case, the speaker registration module 322C does not perform the above-described registration for the speaker feature amount, and only the update of importance, which will be described later, is performed.

In the nonvolatile memory 107, a predetermined number or more of speaker feature data items 403 are not registered to enhance the precision of a speaker identification process by the speaker identification module 322D, which will be described later. Therefore, if a speaker feature data item 403 is registered, the speaker registration module 322C performs a process of determining whether the number of speaker feature data items 403 registered in the nonvolatile memory 107 is greater than or equal to the predetermined number. If a result that the number of speaker feature data items 403 registered in the nonvolatile memory 107 is greater than or equal to the predetermined number is obtained as a result of the determination, the speaker registration module 322C performs a process of deleting a speaker feature data item 403. More specifically, the speaker registration module 322C performs a process of deleting a speaker feature data item 403 in accordance with the importance added to the speaker feature data items 403, such that the number of speaker feature data items 403 registered in the nonvolatile memory 107 becomes less than the predetermined number, which will be described later in detail. That is, a speaker feature data item 403 of small importance is deleted. Accordingly, even if the number of speaker feature data items 403 which can be registered in the nonvolatile memory 107 is limited to enhance the precision of a speaker identification process, which will be described later, a speaker feature data item 403 important to the user can be left. That is, the precision of the speaker identification process can be enhanced without spoiling convenience.

Because the details of the importance will be described later, a detailed explanation thereof is omitted herein.

The speaker identification module 322D performs a process of comparing (speaker identification process) a speaker feature amount extracted by the speaker feature extraction module 322B and a speaker feature amount included in a speaker feature data item 403 stored (registered) in the nonvolatile memory 107. As a technique of comparing the extracted speaker feature amount and the speaker feature amount included in the registered speaker feature data item 403, any already-existing technique may be used. For example, a technique such as i-vector is used. I-vector is a technique of extracting a speaker feature amount by deleting the number of dimensions from certain input using a factor analysis. By this technique, speakers can be efficiently distinguished (compared) even from a small quantity of data.

Let us assume that a speaker name is included (registered) in a speaker feature data item 403 including a speaker feature amount according with the extracted speaker feature amount as a result of the above-described comparison. In this case, the speaker identification module 322D determines that one or more voice sections corresponding to the speaker feature amount (specifically, one or more voice sections including a sound feature amount used to extract the speaker feature amount) belong to the utterance of a speaker (person) indicated by the speaker name.

On the other hand, let us assume that a speaker name is not included (not registered) in the speaker feature data item 403 including the speaker feature amount according with the extracted speaker feature amount. In this case, the speaker identification module 322D acquires the number of times the speaker feature mount was identified until the present (the number of times of speaker identification) as data on the importance added to the speaker feature data item 403 including the speaker feature amount. If the number of times of speaker identification is greater than or equal to two, the speaker identification module 322D determines that the one or more voice sections corresponding to the speaker feature amount belong to the utterance of a speaker (person) whose speaker name has not been registered yet (person who appeared in the past, but whose speaker name has not been registered yet). In addition, if the acquired number of times of speaker identification is one, the speaker identification module 322D determines that the one or more voice sections corresponding to the speaker feature amount belong to the utterance of a new speaker (person) (person who did not appear in the past).

Data indicating a result of the speaker identification process is stored in the nonvolatile memory 107 as one data item included in an index data item 402. That is, the index data item 402 includes data indicating a result of the speaker clustering and a result of the speaker identification regarding an audio data item corresponding to the index data item 402.

The speaker identification module 322D also updates the importance added to a speaker feature data item 403. The importance is, for example, a value calculated by equation (1) below.

$$\text{Importance} = \alpha \times \text{number of times of speaker identification} + \beta \times \text{last time and date of appearance} + \gamma \times \text{presence or absence of user registration} \quad (1)$$

The above terms, $\alpha$, $\beta$, and $\gamma$, are weighting factors. In addition, the number of times of speaker identification included in equation (1) above represents the number of times a predetermined speaker feature amount was identified in the above-described speaker identification process until the present. The last time and date of appearance included in equation (1) above represents how many days ago the last (most recent) recording data item of one or more recording data items including one or more voice sections corresponding to the predetermined speaker feature amount was recorded. The presence or absence of user registration included in equation (1) above represents a value determined based on whether a speaker name is included (registered) in a speaker feature data item 403 including the predetermined speaker feature amount. Specifically, if a speaker name is registered, the value of the presence or absence of user registration in equation (1) above is one. And, if a speaker name is not registered, the value of the presence or absence of user registration in equation (1) above is zero.

Here, the update of the importance will be described using specific values. It is assumed that in equation (1) above, $\alpha$ is 0.01, $\beta$ is −0.0001, $\gamma$ is 1.0, a predetermined speaker feature amount was identified fifteen times until the present, a recording data item including one or more voice sections corresponding to the speaker feature amount was recorded one day ago, and a speaker name is included in a speaker feature data item 403 including the speaker feature amount.

In this case, the speaker identification module 322D calculates the importance by equation (1) above, as follows:

$$\text{Importance} = 0.01 \times 15 + (-0.0001) \times 1 + 1.0 \times 1 = 1.1499$$

Accordingly, the importance added to the speaker feature data item 403 including the predetermined speaker feature amount is updated to the importance 1.1499 calculated in the above manner.

In addition, the case where a is 0.01, 3 is −0.0001, and $\gamma$ is 1.0 as in the above description, and a predetermined speaker feature amount was identified five times until the present, a recording data item including one or more voice sections corresponding to the speaker feature amount was recorded thirty days ago, and a speaker name is not included in a speaker feature data item 403 including the speaker feature amount will also be described.

In this case, the speaker identification module 322D calculates the importance by equation (1) above, as follows:

$$\text{Importance} = 0.01 \times 5 + (-0.0001) \times 30 + 1.0 \times 0 = 0.047$$

Accordingly, the importance included in the speaker feature data item 403 including the predetermined speaker feature amount is updated to the importance 0.047 calculated in the above manner.

Let us assume that the user performs an operation of adding a speaker name corresponding to one or more voice sections classified into a predetermined cluster, for example, in the reproduction view 210-3 shown in FIG. 6. In this case, the speaker provisional registration module 322E acquires a speaker feature amount corresponding to the one or more voice sections included in the predetermined cluster from the nonvolatile memory 107. Then, the speaker provisional registration module 322E generates a speaker feature provisional data item 404 including the acquired speaker feature amount and the speaker name input by the above operation. In addition, the speaker provisional registration module 322E writes the generated speaker feature provisional data item 404 to the nonvolatile memory 107. That is, the speaker provisional registration module 322E provisionally registers the speaker feature amount included in the speaker feature provisional data item 404. Accordingly, if a speaker feature amount is next registered by the speaker registration module 322C, the formal registration of the speaker feature amount can be performed. That is, the registration of the speaker feature amount can be reserved.

<Analysis Processing>

An example of a series of procedures of analysis processing performed by the voice recorder application 202 will be next described with reference to the flowchart of FIG. 8.

If the user activates the voice recorder application 202 and operates (taps) the recording button 400 in the home view 210-1 as shown in FIG. 4, the recording engine 321 starts recording. If the recording button 400 in the home view 210-1 shown in FIG. 4 is operated and recording is started, a screen of a terminal switches from the home view 210-1 shown in FIG. 4 to the recording view 210-2 shown in FIG. 5.

If recording is started, the voice section detection module 321A analyzes a recorded audio data item (or an audio data item from the audio capture unit 113), and determines whether an audio data unit of a predetermined length of time is a voice section or a non-voice section other than the voice section (block B1). If it is determined that the audio data unit of the predetermined length of time is a non-voice section (NO in block B1), the flow returns to the process of block B1, and the voice section detection module 321A performs a process of determining whether the next audio data unit is a voice section or a non-voice section.

On the other hand, if it is determined that the audio data unit of the predetermined length of time is a voice section (YES in block B1), the sound feature extraction module 321B extracts a sound feature amount, for example, a mel frequency cepstrum cofficient (block B2).

Next, the recording engine 321 determines whether the stop button 500A in the recording view 210-2 has been operated (tapped) by the user. That is, it is determined whether recording has been completed (block B3). If it is determined that the stop button 500A in the recording view 210-2 has not been operated, that is, if it is determined that recording is continuously being performed (NO in block B3), the flow returns to the process of block B1. Then, the voice section detection module 321A performs a process of determining whether the next audio data unit is a voice section or a non-voice section.

On the other hand, let us assume that it is determined the stop button 500A in the recording view 210-2 has been operated, that is, it is determined that recording has been completed (YES in block B3). In this case, the clustering module 322A classifies one or more voice sections included in a sequence from the start point to the end point of a recorded audio data item (a set of audio data units) into clusters corresponding to speakers included in the audio data item (block B4). For example, if five speakers are included in the audio data item, the one or more voice sections included in the audio data item is each classified into any of five clusters. Data indicating a result of the process of block B4, that is, data indicating which voice section is included in (belongs to) which cluster, is stored in the nonvolatile memory 107 as an index data item 402.

Then, the speaker feature extraction module 322B extracts a speaker feature amount, which is a speaker-specific feature, from a sound feature amount included in one or more voice sections classified into the same cluster (block B5). For example, if the one or more voice sections included in the audio data item are classified into five clusters as described above, five speaker feature amounts are herein extracted by the speaker feature extraction module 322B.

Next, the speaker registration module 322C registers each of the extracted speaker feature amounts in the nonvolatile memory 107 as a speaker feature data item 403 (block B6).

In addition, the speaker registration module 322C refers to the nonvolatile memory 107, and determines whether a speaker feature provisional data item 404 provisionally registered by the speaker provisional registration module 322E is stored (registered) therein (block B7). If it is determined that the speaker feature provisional data item 404 is not stored (NO in block B7), the flow proceeds to the process of block B9, which will be described later.

On the other hand, if it is determined that the speaker feature provisional data item 404 is stored (YES in block B7), the speaker registration module 322C reregisters a speaker feature amount and a speaker name included in the speaker feature provisional data item 404 provisionally registered in the nonvolatile memory 107 as a speaker feature data item 403 (block B8).

Then, the speaker registration module 322C determines whether the number of speaker feature data items 403 registered in the nonvolatile memory 107 is greater than or equal to a predetermined number. That is, the speaker registration module 322C determines whether the number of registered speaker feature data items 403 exceeds the upper limit (block B9). If it is determined that the number of registered speaker feature data items 403 is not greater than or equal to the predetermined number, that is, the number of registered speaker feature data items 403 is less than the predetermined number (NO in block B9), the flow proceeds to the process of block B11, which will be described later.

On the other hand, if it is determined that the number of registered speaker feature data items 403 is greater than or equal to the predetermined number (YES in block B9), the speaker registration module 322C deletes a speaker feature data item 403 in order of increasing importance added to the speaker feature data items 403 registered in the nonvolatile memory 107, until the number of speaker feature data items 403 becomes less than the predetermined number (block B10). However, it should be noted that a speaker feature data item 403 registered this time in a series of procedures is not deleted.

Next, the speaker identification module 322D compares a speaker feature amount extracted by performing the process of block B5 by the speaker feature extraction module 322B and a speaker feature amount included in a speaker feature data item 403 stored in the nonvolatile memory 107. Let us assume that as a result of the comparison, a speaker name is included in a speaker feature data item 403 including a speaker feature amount according with the extracted speaker feature amount. In this case, the speaker identification module 322D determines that one or more voice sections corresponding to the speaker feature amount belong to the utterance of a speaker (person) indicated by the speaker name. In addition, let us assume that as a result of the comparison, a speaker name is not included in the speaker feature data item 403 including the speaker feature amount according with the extracted speaker feature amount, and the number of times of speaker identification is greater than or equal to two. The number of times of speaker identification is data on the importance added to the speaker feature data item 403. In this case, the speaker identification module 322D determines that the one or more voice sections corresponding to the speaker feature amount belong to the utterance of a speaker whose speaker name has not been registered yet. Moreover, let us assume that as a result of the comparison, a speaker name is not included in the speaker feature data item 403 including the speaker feature amount according with the extracted speaker feature amount, and the number of times of speaker identification is one. The number of times of speaker identification is data on the importance added to the speaker feature data item 403. In this case, the speaker identification module 322D determines that the one or more voice sections corresponding to the speaker feature amount belong to the utterance of a new speaker (block B11). It should be noted that the process of block B11 is repeatedly performed by the number of speaker feature amounts extracted in the process of block B5. Data indicating a result of the process of block B1 is stored in the nonvolatile memory 107 as an index data item 402.

Then, the speaker identification module 322D updates the importance added to the speaker feature data item 403 including the speaker feature amount according with the speaker feature amount extracted in the process of block B5 (block B12), and ends a series of procedures of analysis processing herein.

By means of the above-described analysis processing, speaker feature amounts can be registered dispersedly at the time of the analysis processing and at the time of the provisional registration performed by the speaker provisional registration module 322E, and thus, a time required for speaker learning can be reduced. Especially, a time required for speaker learning at the time of the provisional registration performed by the speaker provisional registration module 322E in response to the user's operation can be greatly reduced.

<Reproduction View>

Figure 8:
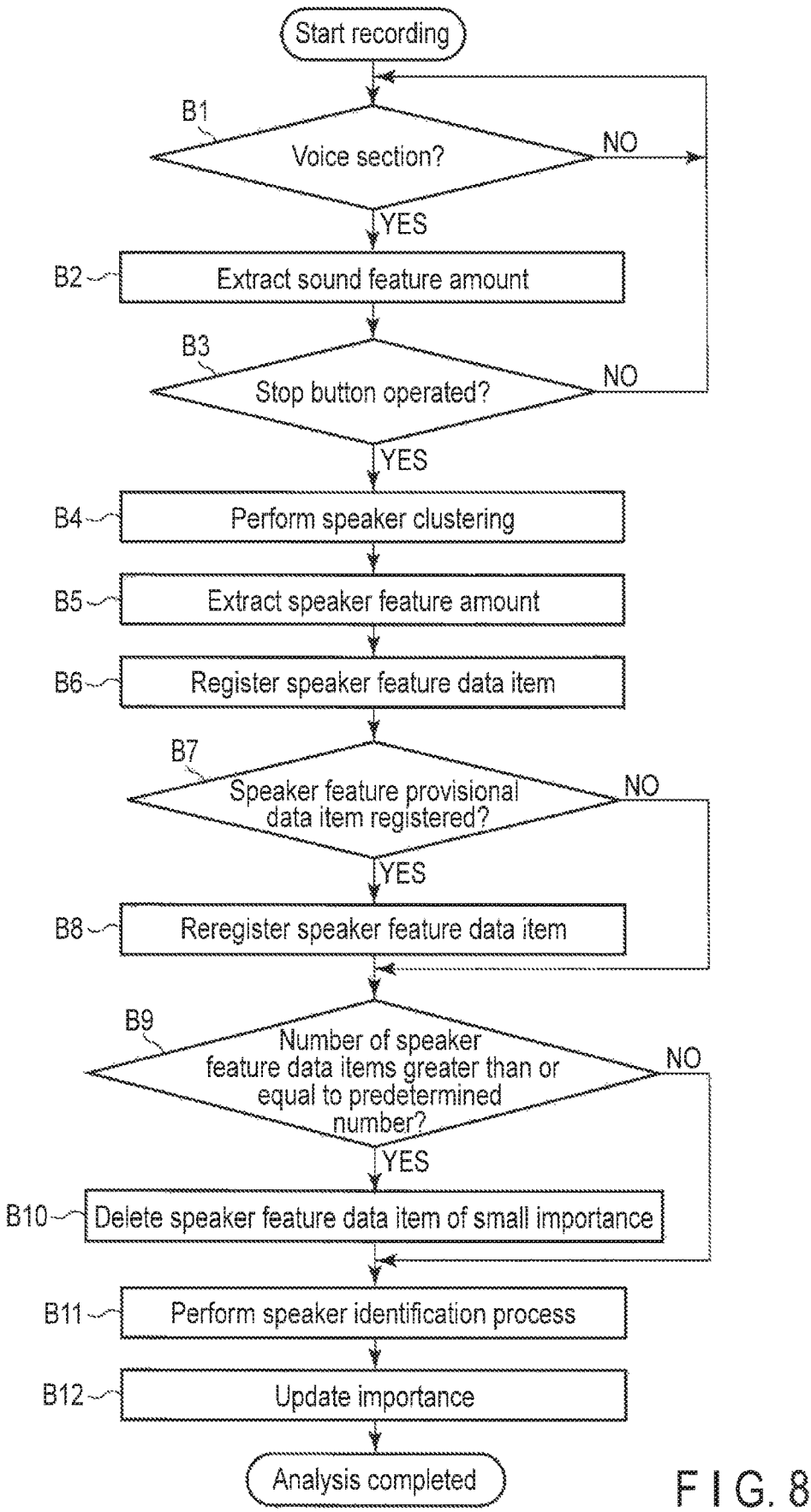
FIG. 8 is a flowchart showing an example of a series of procedures of analysis processing by the voice recorder application of embodiments.
Figure 9:
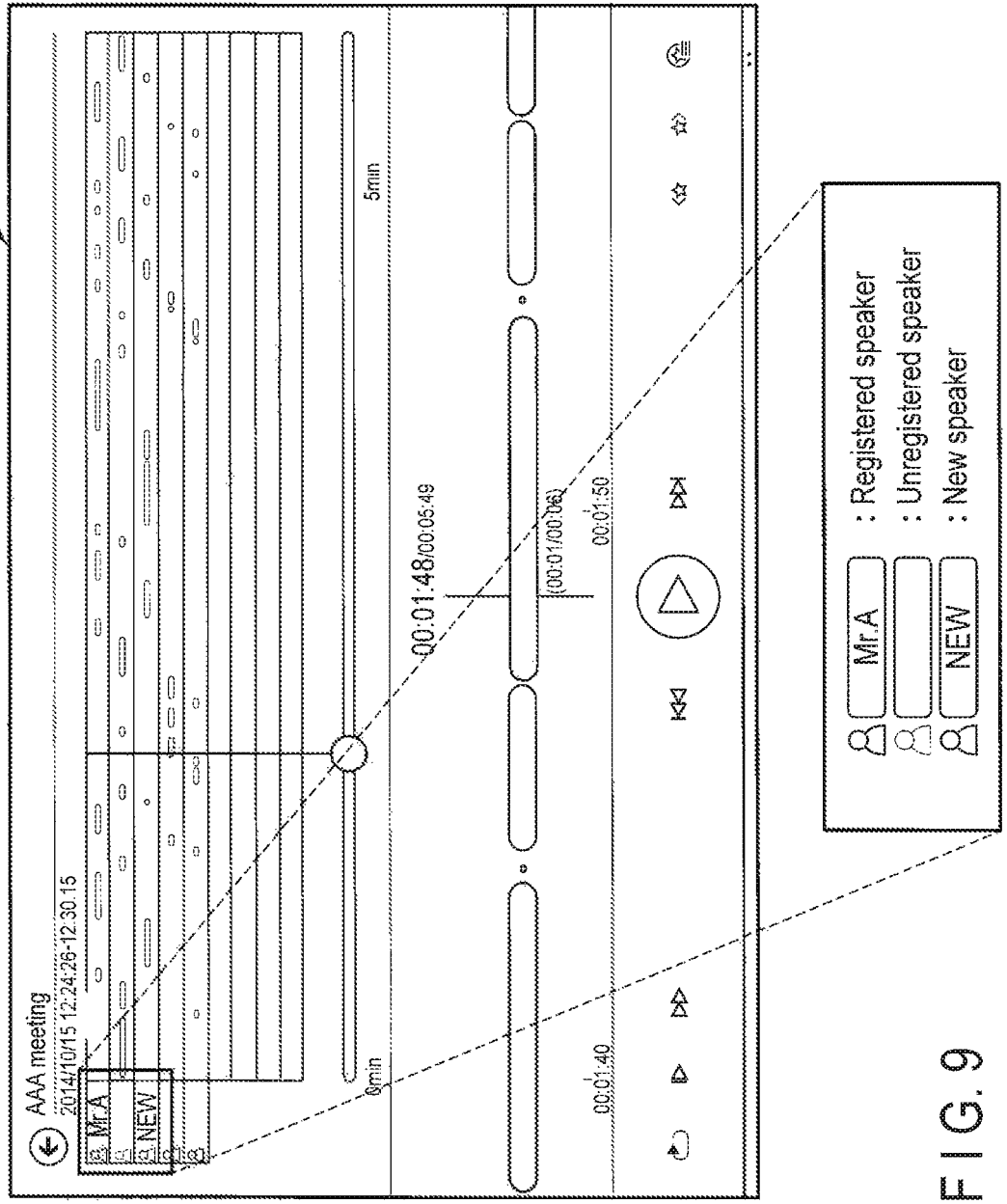
FIG. 9 is a diagram for explaining a status related to a speaker name.

FIG. 9 shows an example of the reproduction view 210-3 displayed if a predetermined recording data item is reproduced after the analysis processing shown in FIG. 8 is performed for the predetermined recording data item. Since the analysis processing shown in FIG. 8 was performed, with respect to speaker names, three types of status can be displayed in a distinguishable form in the speaker identification result view area 601 of the reproduction view 210-3. Specifically, a speaker whose speaker name has been registered, a speaker whose speaker name has not been registered yet and a new speaker can be displayed in a distinguishable form. The speaker whose speaker name has been registered is a speaker whose speaker name is included in a speaker feature data item 403. The speaker whose speaker name has not been registered yet is a speaker whose speaker name is not included in a speaker feature data item 403 and whose number of times of speaker identification regarding the importance added to the speaker feature data item 403 is greater than or equal to two. The new speaker is a speaker whose speaker name is not included in a speaker feature data item 403 and whose number of times of speaker identification regarding the importance added to the speaker feature data item 403 is one.

For example, if the analysis processing shown in FIG. 8 is performed, at a left end of one or more voice sections corresponding to a speaker feature amount whose speaker name is identified by the speaker identification module 322D, the speaker name (for example, "Mr. A") is displayed. In addition, when the analysis processing shown in FIG. 8 is performed, at a left end of one or more voice sections corresponding to a speaker feature amount which the speaker identification module 322D identifies as belonging to the utterance of a speaker whose speaker name has not been registered yet, nothing is displayed to indicate that the speaker name has not been registered yet. Moreover, if the analysis processing shown in FIG. 8 is performed, at a left end of one or more voice sections corresponding to a speaker feature amount which the speaker identification module 322D identifies as belonging to the utterance of a new speaker, the text "NEW" is displayed to indicate the new speaker.

<Pop-Up Window>

FIG. 10 shows an example of a pop-up displayed if a speaker name displayed in the reproduction view 210-3 is erroneous, and the user corrects the speaker name. If the user performs an operation of correcting the speaker name, for example, tapping or pressing for long the speaker name displayed in the reproduction view 210-3, the voice recorder application 202 displays a pop-up as shown in FIG. 10. Specifically, the voice recorder application 202 acquires all of one or more speaker feature data items 403 stored in the nonvolatile memory 107, and displays a pop-up on which a speaker name included in the one or more speaker feature data items 403 can be selected as a correction candidate. Accordingly, the user can easily correct the speaker name.

<Tutorial Window>

FIG. 11 shows an example of a tutorial displayed in the reproduction view 210-3. The tutorial shown in FIG. 11 is displayed by the voice recorder application 202, if all the statuses of speaker names displayed in the speaker identification result view area 601 of the reproduction view 210-3 are new speakers. In addition, the tutorial is displayed by the voice recorder application 202, if the statuses of the speaker names displayed in the speaker identification result view area 601 of the reproduction view 210-3 include a combination of an unregistered speaker and a new speaker, and the number of times the tutorial was displayed is less than a predetermined number. The content of the tutorial is a message prompting entry of a speaker name, for example, the message "Please enter speaker name. Same speaker will be automatically displayed from next time." Accordingly, the registration (provisional registration) of a speaker name can be prompted without imposing stress on the user.

According to the above-described one embodiment, the electronic device 1 has the following structure: at the time of speaker learning performed in response to the user's operation, only a speaker feature provisional data item 404 including a speaker feature amount and a speaker name is provisionally registered. In this structure, right after an audio data item is recorded, the speaker feature amount and the speaker name included in the speaker feature provisional data item 404 are reregistered as a speaker feature data item 403. That is, electronic device 1 has the structure in which speaker learning is performed dispersedly. Accordingly, a time required for speaker learning can be greatly reduced, whereby a speaker learning function which does not impose stress on the user can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a microphone configured to collect a voice;
   a memory in which at least the collected voice and speaker feature data are stored;
   a display configured to display at least a recording view and a reproduction view as a display screen; and
   a hardware processor configured to execute a voice recorder application, the hardware processor configured to:

record the voice collected by the microphone as audio data on the memory according to a recording operation in the recording view;

classify a plurality of voice sections of the recorded audio data into a plurality of clusters corresponding to a plurality of speakers, for displaying the reproduction view;

extract a speaker feature amount included in one or more voice sections classified into the same cluster, and register in the memory the speaker feature amount as the speaker feature data;

delete the speaker feature data whose importance is low if the number of the speaker feature data of the memory exceeds a predetermined number; and compare the extracted speaker feature amount with the speaker feature data which have been registered, and identify a speaker name included in the speaker feature data which includes the extracted speaker feature amount as a speaker of the voice sections.

2. The electronic device of claim 1, wherein the hardware processor is further configured to:

acquire the number of times the speaker feature amount has been identified up to the present as information on importance, if no speaker name is included in the speaker feature data;

identify the speaker name as a speaker who appeared in the past but whose speaker name has not been registered yet, if the number of times is greater than or equal to two; and identify the speaker name as a new speaker who did not appear in the past, if the number of times is one.

3. The electronic device of claim 1, wherein speaker feature provisional data including a provisionally-registered speaker feature amount and a speaker name is further stored in the memory.

4. The electronic device of claim 3, wherein the hardware processor is further configured to:

acquire, if a speaker name corresponding to one or more voice sections classified into a predetermined cluster is added in the reproduction view, the speaker feature amount corresponding to the voice sections; and generate speaker feature provisional data including the acquired speaker feature amount and a speaker name input from the display screen.

5. The electronic device of claim 4, wherein the hardware processor is further configured to register, when the extracted speaker feature amount is registered in the memory as the speaker feature data and if the speaker feature provisional data is stored in the memory, the speaker feature provisional data.

6. The electronic device of claim 1, wherein importance related to a speaker feature amount is added to the speaker feature data, and the hardware processor is further configured to delete, when the extracted speaker feature amount is registered in the memory as the speaker feature data and if the number of speaker feature data registered in the memory is greater than or equal to the predetermined number, the speaker feature data whose importance is low until the number of speaker feature data becomes less than the predetermined number.

7. The electronic device of claim 6, wherein the importance is updated each time the speaker feature amount in the speaker feature data is identified as being included in the recorded audio data.

8. The electronic device of claim 1, wherein the hardware processor is further configured to display all user names registered in the memory with the speaker feature amounts in a selectable form as a correction candidate in response to a command to correct a speaker name from the display screen.

9. The electronic device of claim 1, wherein the hardware processor is further configured to display on the display screen a tutorial for inputting a speaker name, if all statuses of speaker names displayed in the reproduction view are new speakers.

10. A method of a display device comprising:

a microphone configured to collect a voice;

a memory in which at least the collected voice and speaker feature data are stored; and a display configured to display at least a recording view and a reproduction view as a display screen, the method comprising:

recording the voice collected by the microphone as audio data on the memory according to a recording operation in the recording view;

classifying a plurality of voice sections of the recorded audio data into a plurality of clusters corresponding to a plurality of speakers, for displaying the reproduction view;

extracting a speaker feature amount included in one or more voice sections classified into the same cluster, and register in the memory the speaker feature amount as the speaker feature data;

deleting the speaker feature data whose importance is low if the number of the speaker feature data of the memory exceeds a predetermined number; and comparing the extracted speaker feature amount with the speaker feature data which have been registered, and identifying a speaker name included in the speaker feature data which includes the extracted speaker feature amount as a speaker of the voice sections.

\* \* \* \* \*